United States Patent [19]

Van Abbema

[11] Patent Number: 4,580,928

[45] Date of Patent: Apr. 8, 1986

[54] OUTLET DUCT FOR A PNEUMATIC CONVEYOR

[75] Inventor: Art Van Abbema, Winnipeg, Canada

[73] Assignee: Vana Industries Ltd., Winnipeg, Canada

[21] Appl. No.: 571,816

[22] Filed: Jan. 18, 1984

[51] Int. Cl.[4] .................... B65G 53/28; B65G 53/52
[52] U.S. Cl. ............................... 406/109; 285/281; 406/43
[58] Field of Search ................ 406/39, 43, 109, 115, 406/165, 166; 285/280, 281

[56] References Cited

U.S. PATENT DOCUMENTS

| | | | |
|---|---|---|---|
| 570,890 | 11/1896 | Baird | 285/281 X |
| 1,436,392 | 11/1922 | Ganz | 285/281 |
| 2,833,568 | 5/1958 | Corsette | 285/281 |
| 3,570,641 | 3/1971 | Lefeuvre | 406/165 X |
| 4,433,946 | 2/1984 | Christianson et al. | 406/109 X |

FOREIGN PATENT DOCUMENTS

| | | | |
|---|---|---|---|
| 1632850 | 2/1971 | Fed. Rep. of Germany | 406/165 |
| 82/00451 | 2/1982 | PCT Int'l Appl. | 406/109 |

*Primary Examiner*—Jeffrey V. Nase
*Attorney, Agent, or Firm*—Stanley G. Ade

[57] ABSTRACT

A pneumatic conveyor of particulate material includes an air pump with an inlet duct to the air pump communicating with a cyclone for extracting the particulate material from the air stream and then depositing the particulate material in an outlet duct from the air pump. The outlet duct includes a vertical section, an outwardly extending section with a hinge between the two to provide folding of the outwardly extending section relative to the vertical section for a storage position. In addition, a flange and collar connection is provided between two portions of the vertical section whereby the upper portion and the outwardly extending section can be rotated about the lower portion of the vertical section.

13 Claims, 5 Drawing Figures

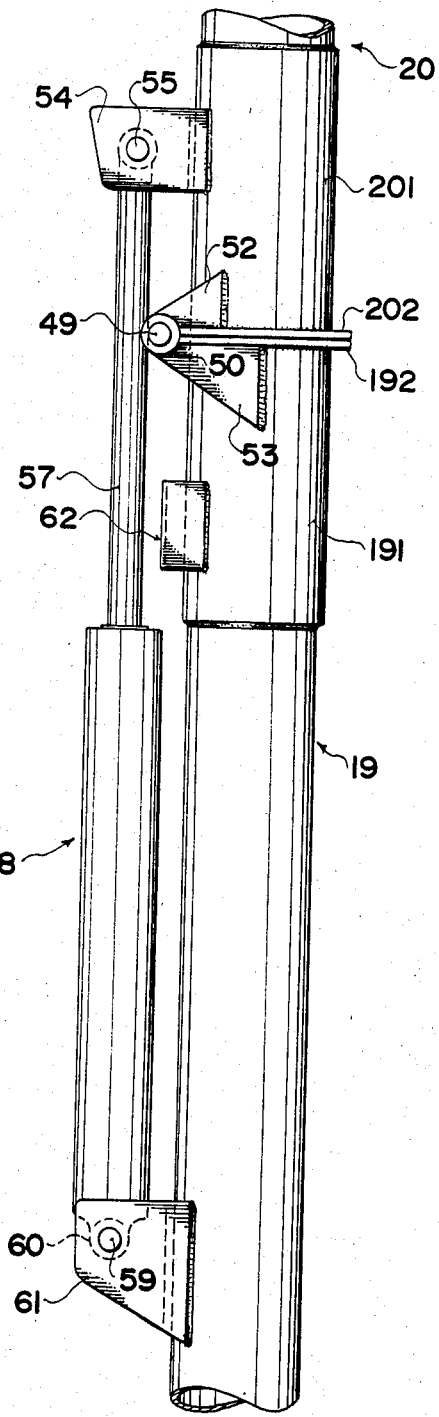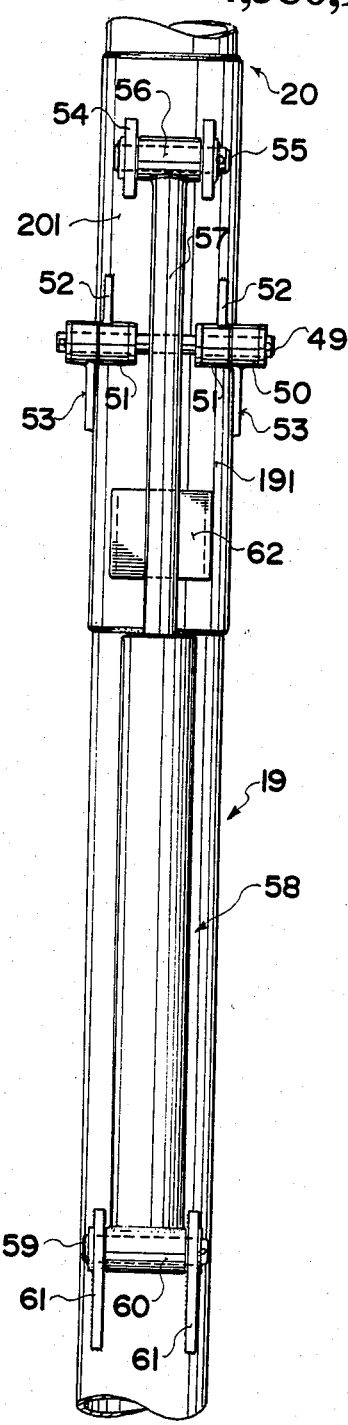
FIG. 4
FIG. 5

OUTLET DUCT FOR A PNEUMATIC CONVEYOR

BACKGROUND OF THE INVENTION

This invention relates to pneumatic conveyors of the type comprising an air pump for developing an air stream, an inlet duct connected to the air pump whereby a particulate material is drawn into the inlet duct by the air stream, a cyclone separator in the duct for extracting the particulate material from the air stream prior to entry into the air pump and an outlet duct including an air lock valve for injecting the particulate material into the outlet duct from the cyclone separator for transport to remote locations.

Pneumatic conveyors of this type have been developed in recent years by a number of different manufacturers, particularly for transport of grain since this is a very convenient and rapid method of transporting grain between various components such as trucks, storage bins and dryers.

SUMMARY OF THE INVENTION

It is one object of this invention to provide an improved pneumatic conveyor of this type where the outlet duct is modified to provide more convenient discharge of the particulate material at substantially any desired orientation around the conveyor.

In accordance with the invention therefore there is provided a pneumatic conveyor for particulate material comprising an air pump for developing an air stream, an inlet duct connected to said air pump whereby the particulate material is drawn into said inlet duct by said air stream, a cyclone separator in the duct for extracting the particulate material from the air stream prior to entry into said air pump, an outlet duct, valve means for injecting the particulate material from said cyclone separator into said outlet duct for transport to a remote location, the outlet duct including a vertical section for raising the material to a position on a higher level than said pump and a section extending outwardly from the top of the vertical section including a first portion and a second portion co-axial to and directly above the first portion and means for rotating the second portion relative to the first portion whereby to rotate the outwardly extending section to different angular positions around the axis of the vertical section.

It is one advantage of the invention therefore that the outlet duct includes a vertical section with a part of the vertical section being rotatable about the axis of the vertical section so as to move a discharge end of the outlet duct around the vertical axis to any convenient position. The outlet duct is generally of a rigid construction and includes an outlet cyclone which acts to extract the particulate material from the air and deposit it through the discharge outlet of the cyclone.

The particular construction of the joint between the rotatable portion of the vertical section and the stationary portion is of considerable importance in that it provides a rigid support for the rotatable portion and also prevents the escape of air at the junction which would reduce the efficiency of transport and also possibly clog the joint with the particulate material or dust from the particulate material.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 4 is a side elevational view of a portion of FIG. 1 showing the hinge between the outwardly extending section and the vertical section of the outlet duct.

FIG. 5 is a front elevational view of the portion illustrated in FIG. 4.

In the drawings like characters of reference indicate corresponding parts in the different figures.

DETAILED DESCRIPTION

Figure 1:
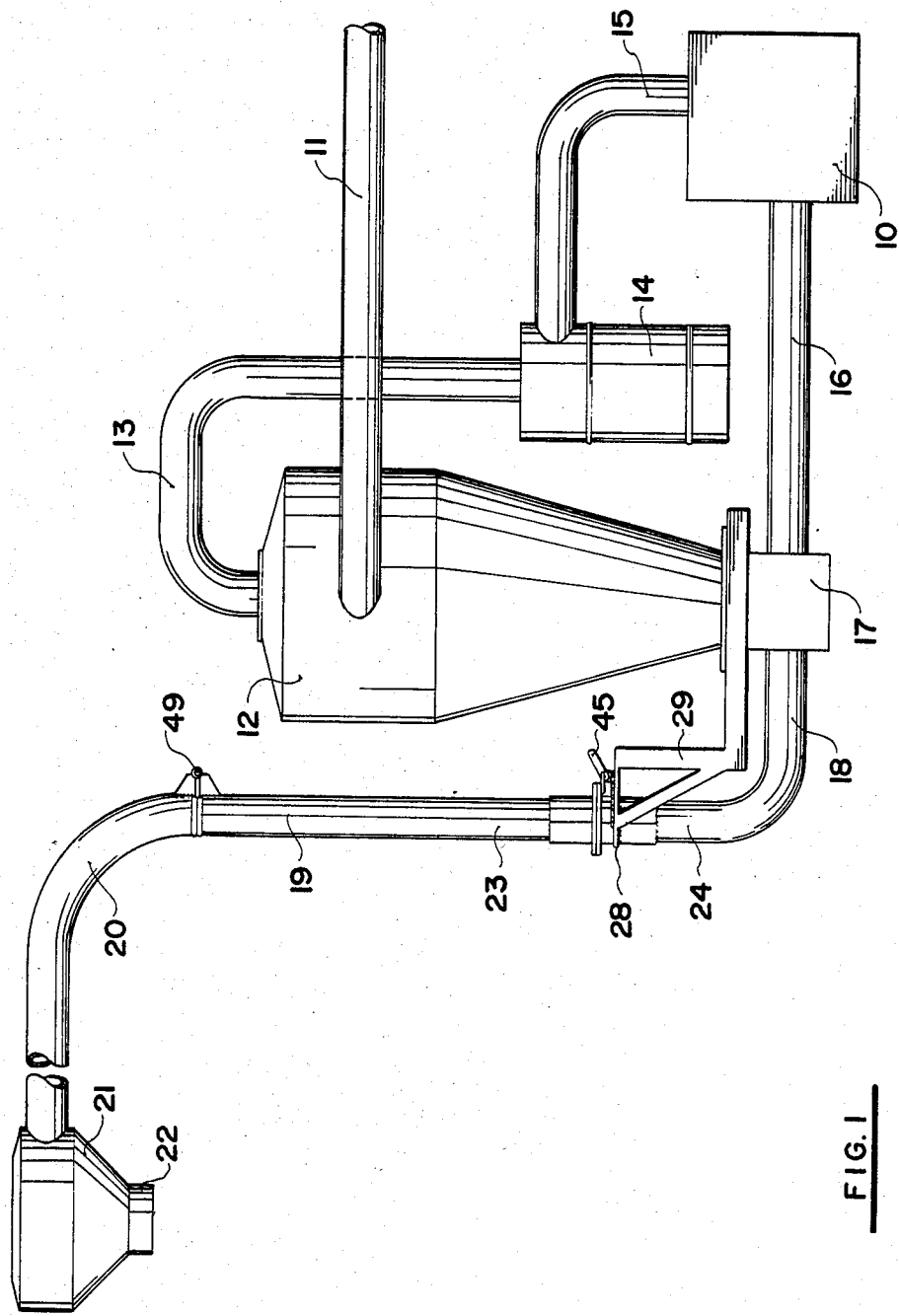
FIG. 1 is a schematic side elevational view of a pneumatic conveyor.

The pneumatic conveyor comprises an air pump 10 which is illustrated only in schematic form with an inlet duct to the air pump through which an air stream developed by the air pump passes. The inlet duct includes an inlet nozzle which is not shown but which can be of conventional form leading to a first duct section 11 which communicates with a cyclone 12. The cyclone, as is known, acts to extract the particulate material drawn in from the nozzle (not shown) through the inlet duct section 11 from the air. The particulate material falls to the bottom of the cyclone while the air is drawn to the top of the cyclone through a duct 13 which passes through a filter 14 to the inlet 15 of the air pump. The air stream developed by the air pum is injected into an outlet duct 16 which communicates with an air lock valve 17 shown only schematically which in turn controls the feed of the particulate material from the bottom of the cyclone 12 into the outlet duct 16 for transport to a discharge nozzle.

The outlet duct 16 includes a first horizontal portion which communicates with the air lock 17 and then passes through a right angle bend or elbow 18 into a vertical section 19. Finally, an outwardly extending section 20 curves out from the top of the vertical section toward a discharge nozzle 21 which includes a cyclone for extracting the particulate material from the air stream and depositing the material downwardly through an outlet 22 into any suitable receptacle.

Thus, the vertical section 19 acts to raise the material to a higher level than the pump 10 so that the material can be discharged downwardly into the receptacle and the outwardly extending portion 20 extends away from the body of the pneumatic conveyor can be positioned adjacent the receptacle for discharge into the receptacle. The receptacle may be a truck box dryer inlet or feed bucket of an auger, but this is not part of the invention.

Figure 2:
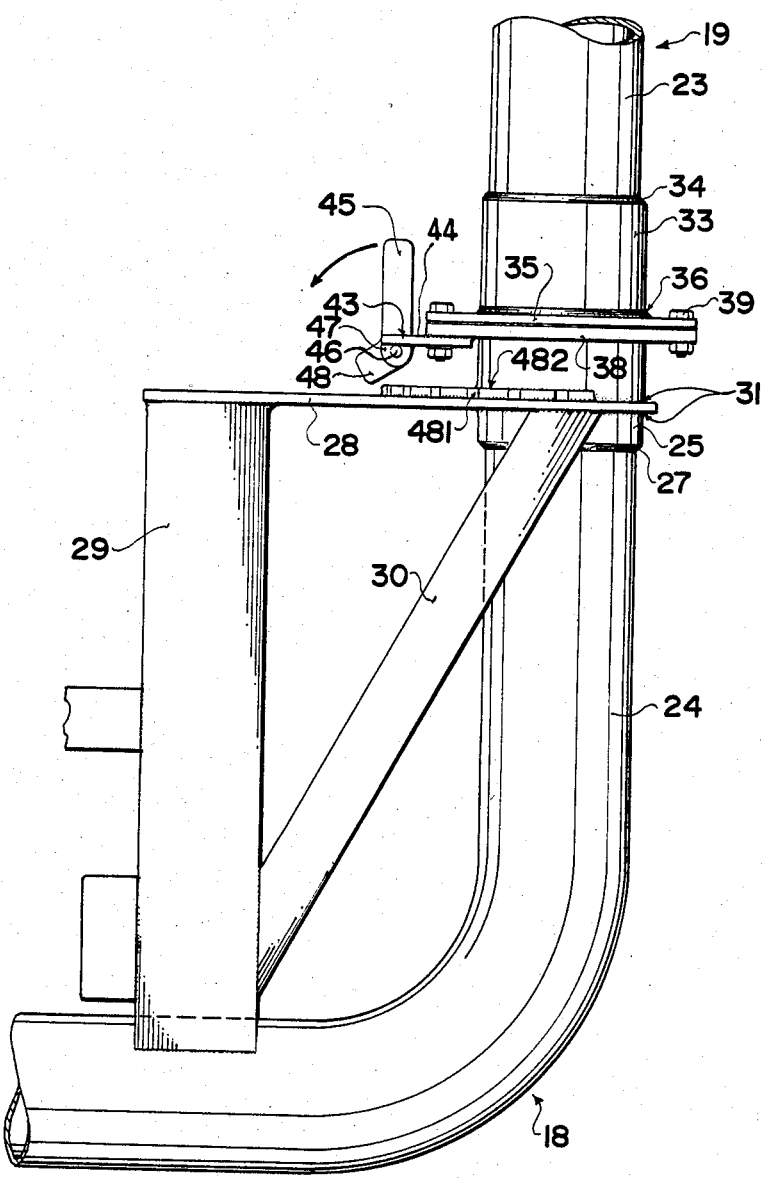
FIG. 2 is a side view on an enlarged scale of a part of the outlet duct of the pneumatic conveyor of FIG. 1.
Figure 3:
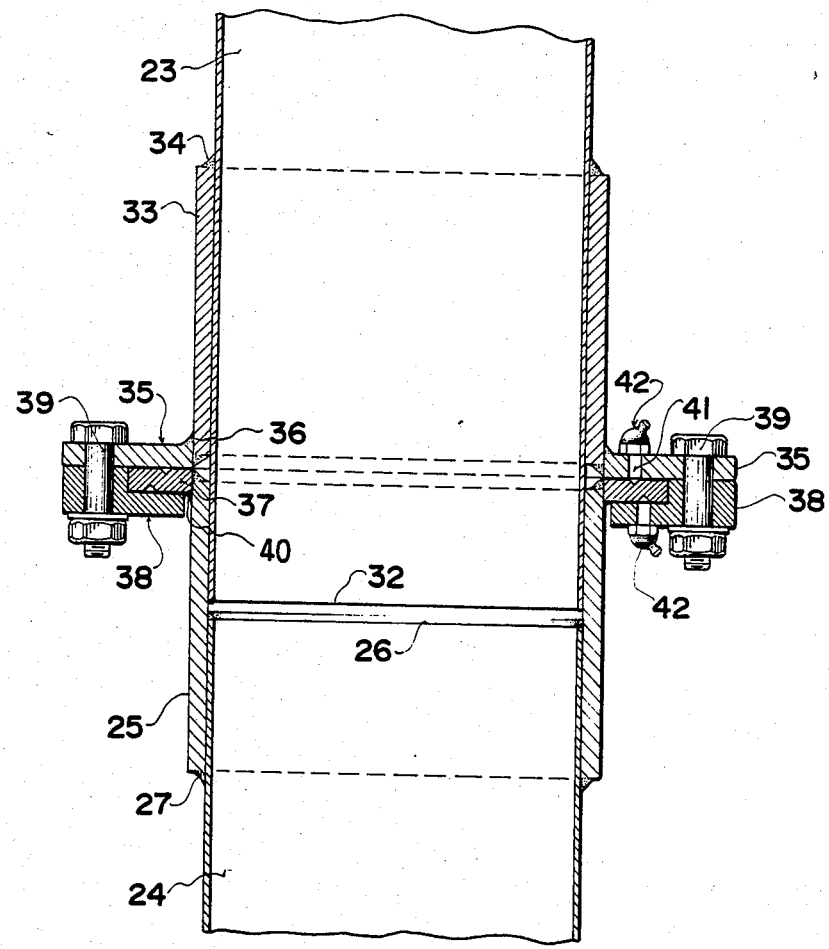
FIG. 3 is a cross sectional view on a yet further enlarged scale along the lines 3—3 of FIG. 2.

Turning now to FIGS. 2 and 3, the vertical section of the outlet duct is illustrated showing the junction between an upper portion 23 which is rotatable relative to a lower portion 24.

The lower portion 24 has attached to the upper end thereof, a collar 25 which stands proud from the end of the lower section indicated at 26. The collar is attached to the lower portion 24 by a weld line 27. The collar 25 is supported in a flat plate which lies in the horizontal plane, the plate indicated at 28. The plate in turn is supported upon a vertical bracket 29 with a stiffening strut 30 extending at an angle from the vertical bracket 29 to an outstanding end of the plate 28 adjacent the vertical section of the outlet duct. The collar 25 is received within a hole in the plate 28 and is welded thereto by surrounding weld lines 31. The upper portion 23 is co-axial to the lower portion 24 and the end indicated at 32 thereof lies closely adjacent or substantially abutting the end 26 of the lower portion 24. Thus, the end section of the upper portion 23 extends into the collar or sleeve 25 so the joint between the ends 26 and 32 is received within the collar 25 and is protected thereby.

A collar 33 is attached to the end of the upper portion 23 so the collar substantially abuts the collar 25 with the abutment between the collars spaced from the abutment between the ends 26, 32. The collar 33 is attached to the portion 23 by a weld line 34.

The collar 33 is attached to an annular flange 35 which extends around the collar 33 and extends outwardly therefrom lying a horizontal plane. The flange 35 is welded by weld lines 36 to the collar 33. In a similar manner, a second flange 37 is welded to the upper end of the collar 25 and extends outwardly therefrom parallel to the first flange 35. However, the radial extent of the first flange 35 is greater than that of the second flange 37 so as to provide an overhang around the periphery of the flange 37.

A clamping ring 38 is shaped to enclose the second flange 37 and to abut the underside of the first flange 35 outside the second flange 37 so that when bolted to the first flange by bolts 39, the clamping ring 38 and the first flange 35 clamp the second flange 37. The inward extent of the clamping ring 38 is such that the inner edge thereof lies as closely adjacent the outer surface of the collar 25 as possible and for this reason the lower weld line 40 of the flange 37 is small in dimension.

Grease channels 41 are provided in the upper and lower surfaces of the second flange 37 and connect to grease nipples 42 to provide a greased surface between the first flange and the second flange and between the second flange and the clamping ring. In this way, the upper portion including the first flange and the clamping ring can be rotated about the vertical axis of the vertical section of the outlet duct.

The construction of the flanges and collars provides a substantially air-tight seal in that for air to escape from the joint between the upper and lower portions of the vertical section, it must pass between the collar 25 and the outer surface of the upper portion 23 and then outwardly between the greased surfaces of the second flange 37 and the inner edge of the ring 38. In addition, the arrangement of the flanges and collars provides a rigid structure which retains the upper and lower portions in the required co-axial position and provides sufficient strength to support the weight of the upper section including the outwardly extending section and to resist any twisting movements caused by the overhanging weight of the outwardly extending section In order to control the angular position of the upper portion 23 relative to the lower portion 24, a lug 43 is attached to one of the bolts 39 so as to extend outwardly from the undersurface of the clamping ring 38. The lug 43 has a slot for receiving a latch 44 with a manually graspable handle section 45 for pivoting the latch about a horizontal pivot pin 46 mounted on a pair of depending support flanges 47 carried by the lug 43. The latch includes a latch projection 48 at right angles to the handle 45 for cooperation with a plurality of slots 481 provided in a ring 482 mounted on the plate 28 co-axial to the axis of the vertical section of the outlet duct.

The ring 482 can includes slots at, for example 15° spacing whereby the latch pin can be lifted from one of the slots, the upper portion 23 rotated through 15° and then the latch dropped again under bias provided by the weight of the handle into the next adjacent slot. In this way, the position of the upper portion 23 is maintained regardless of any vibration of the outlet duct tending to cause wandering of the position of the upper portion 23.

Turning now to FIGS. 4 and 5, those illustrated the hinge between the vertical section 19 and the outwardly extending section 20. The hinge includes a hinge pin 49 mounting two pairs of collars 50, 51. Each of the inner pair 51 is welded to a lug 52 which extends outwardly from the bottom of the outwardly extending section 20 with the lugs 52 spaced on either side of the axis and welded to the outer surface of a collar 201 surrounding the lower end of the section 20. Each of the outer pair is welded to a lug 53 which in turn is welded to the outer surface of a collar 191 surrounding the upper end of the vertical section 19. The collars 201 and 191 provide strenghtening of the sections adjacent the end and each includes a horizontal flange 202, 192 which surround the collars 201 and 191 respectively for abutting in the extended position of the outwardly extending section 20.

The collar 201 also includes a further pair of lugs 54 receiving a pin 55 which carries a collar 56 attached to the end of a piston rod 57 of a piston/cylinder arrangement 58. The other end of the piston/cylinder 58 is attached via a pin 59 and collar 60 to a pair of lugs 61 welded to the vertical section 19.

Thus, the outwardly directed section 20 can be pivoted about the hinge pin 49 by retraction of the pin/cylinder 58 into a folded position. The extent of the pivotal movement is controlled by the engagement of the lugs 54 with a pad 62 attached to the collar 191. When the lugs 54 engage the pad 62, the first vertical length of the outwardly extending section 20 lies substantially parallel to the section 19 and extends downwardly.

In this way, not only can the outwardly extending section be turned about the vertical axis, it can also be folded to take up a transport or storage position with the angular orientation arranged for most convenient positioning of the outwardly extending portion in the folded position.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A pneumatic conveyor for particulate material comprising an air pump for developing an air stream, in inlet duct connected to said air pump whereby the particulate material is drawn into said inlet duct by said air stream, a cyclone separator in the duct for extracting the particulate material from the air stream prior to entry into said air pump, and outlet duct, valve means for injecting the particulate material from said cyclone separator into said outlet duct for transport to a remote location, the outlet duct including a vertical duct section for raising the material to a postion on a higher level than said pump, a discharge duct section which provides a smooth curve to a horizontal duct portion extending outwardly from the top of the vertical section to one side thereof a discharge cyclone mounted on an outer end of said horizontal duct portion including a downwardly projecting nozzle for discharge of the material downwardly and to one of said pump, and transverse hinge means between said vertical section and said discharge section arranged on a side of the vertical section opposite to said horizontal duct portion, whereby the discharge section can be folded down to lie alongside the vertical section with the horizontal portion and discharge cyclone projecting outwardly therefrom on the same side as the hinge means said vertical section including a first portion and a second portion co-axial to and directly above the first portion and means for rotating the second portion relative to the first portion whereby to rotate the folded discharge section to different angular positions around the axis of the vertical section.

2. A conveyor according to claim 1 including hinge means for folding the outwardly extending section relative to the vertical section about a horizontal axis.

3. A conveyor according to claim 2 wherein the folding movement is actuated by an hydraulic cylinder/piston arrangement.

4. A conveyor according to claim 3 wherein the piston is attached to a lug on the outwardly extending portion and wherein there is provided a pad on the vertical portion for contacting the lug in the folded position.

5. A conveyor according to claim 2 wherein each of the vertical section and the outwardly extending section include a surrounding elongate cylindrical collar at the hinge means.

6. A conveyor according to claim 1 wherein the means for rotating includes a pair of sleeves each attached to the end of respective one of the vertical portions with the sleeve of one portion having a mounted end extending axially beyond the end of that portion and the sleeve of the other portion having an outer end at a position spaced inwardly from the end of the other portion whereby the portions have substatially abutting ends within the sleeve of said one portion.

7. A conveyor according to claim 6 wherein the means for rotating comprises a first annular flange attached to and surrounding the sleeve of one vertical portion, a second annular flange attached to and surrounding the sleeve of the other vertical portion and a clamping ring attached to the first flange so as to clamp the second flange between the first flange and the clamping ring.

8. A conveyor according to claim 1 wherein the means for rotating comprises a first annular flange attached and surrounding one vertical portion, a second annular flange attached and surrounding the other vertical portion and a clamping ring attached to said one flange so as to clamp the second flange between the first flange and the clamping ring.

9. A conveyor according to claim 8 wherein the second flange includes grease rings therearound.

10. A conveyor according to claim 8 wherein an inner edge of the clamping ring terminates as close as possible to the other vertical portion.

11. A conveyor according to claim 1 including means for locating the second vertical portion in a plurality of spaced angular positions relative to the first vertical portion.

12. A conveyor according to claim 11 wherein the locating means comprises a latch mounted for pivotal movement into one of a plurality of angularly spaced openings and means for biasing said latch into said openings.

13. A conveyor according to claim 1 wherein the first vertical portion is supported by a horizontal plate.

* * * * *